(12) United States Patent
Iwasaki

(10) Patent No.: US 11,108,589 B2
(45) Date of Patent: Aug. 31, 2021

(54) BATTERY MODULE, CONTROL METHOD, PROGRAM, AND INFORMATION PROCESSING SYSTEM

(71) Applicant: Envision AESC Energy Devices Ltd., Sagamihara (JP)

(72) Inventor: Ryo Iwasaki, Sagamihara (JP)

(73) Assignee: Envision AESC Energy Devices Ltd., Sagamihara (JP)

( * ) Notice: Subject to any disclaimer, the term of this patent is extended or adjusted under 35 U.S.C. 154(b) by 207 days.

(21) Appl. No.: 16/483,514

(22) PCT Filed: Feb. 14, 2018

(86) PCT No.: PCT/JP2018/004986
§ 371 (c)(1),
(2) Date: Aug. 5, 2019

(87) PCT Pub. No.: WO2018/155271
PCT Pub. Date: Aug. 30, 2018

(65) Prior Publication Data
US 2020/0021460 A1 Jan. 16, 2020

(30) Foreign Application Priority Data
Feb. 21, 2017 (JP) .............................. JP2017-030350

(51) Int. Cl.
*H04L 12/40* (2006.01)
*H01M 10/48* (2006.01)

(52) U.S. Cl.
CPC .......... *H04L 12/40* (2013.01); *H01M 10/482* (2013.01)

(58) Field of Classification Search
CPC .............................. H04L 12/40; H01M 10/482
See application file for complete search history.

(56) References Cited

U.S. PATENT DOCUMENTS

2014/0091770 A1 4/2014 Lee et al.
2017/0237707 A1* 8/2017 Jo ....................... G06F 13/4247
709/245

FOREIGN PATENT DOCUMENTS

JP 2009-296079 A 12/2009
JP 2012-244794 A 12/2012
(Continued)

OTHER PUBLICATIONS

International Search Report of PCT/JP2018/004986 dated May 15, 2018.

*Primary Examiner* — Siming Liu
(74) *Attorney, Agent, or Firm* — Sughrue Mion, PLLC

(57) ABSTRACT

A communication network (3020) is a bus type communication network that communicably connects each battery module (2000). In the battery module (2000), a communication identifier that is used in communication through the communication network (3020) is set. A transmission unit (2020) transmits identifier information to all of the other battery modules (2000) through the communication network (3020). The identifier information indicates a candidate identifier that is a candidate of the communication identifier. A communication arbitration unit (2060) performs communication arbitration for the identifier information transmitted by the transmission unit (2020). In a case of winning in the communication arbitration, a decision unit (2080) decides the candidate identifier indicated in the transmitted identifier information as the communication identifier used by the battery module (2000). On the other hand, in a case of losing in the communication arbitration, the transmission unit (2020) transmits the identifier information again.

16 Claims, 7 Drawing Sheets

(56) References Cited

FOREIGN PATENT DOCUMENTS

| | | |
|---|---|---|
| JP | 2013-109628 A | 6/2013 |
| JP | 2013-157851 A | 8/2013 |
| JP | 2015-507451 A | 3/2015 |
| JP | 2015-177234 A | 10/2015 |

\* cited by examiner

FIG. 5

| CAN ID PART | DATA BODY PART |
|---|---|
| FIXED VALUE | (CANDIDATE IDENTIFIER, UNIQUE NUMBER) |

BATTERY MODULE, CONTROL METHOD, PROGRAM, AND INFORMATION PROCESSING SYSTEM

CROSS REFERENCE TO RELATED APPLICATIONS

This application is a National Stage of International Application No. PCT/JP2018/004986 filed Feb. 14, 2018, claiming priority based on Japanese Patent Application No. 2017-030350 filed Feb. 21, 2017, the entire disclosures of which are incorporated herein.

TECHNICAL FIELD

The present invention relates to a battery module, a control method, a program, and an information processing system.

BACKGROUND ART

Storage batteries have been used in various situations. For example, a storage battery is used for storing electric power that is acquired by electric power generation using renewable energy such as sunlight.

The storage battery includes one or more battery modules. The battery module includes one or more secondary batteries such as lithium ion batteries. Furthermore, the battery module contains a controller for exchanging control information or the like with other battery modules. The controller is called a battery management unit (BMU). Communication between battery modules is performed through a communication network such as a controller area network (CAN).

In a case where the control information or the like is exchanged through the communication network, an identifier is needed in order to identify each battery module. One of methods for setting the identifier in the battery module is a method in which a manager or the like of the battery module manually sets the identifier. For example, an identifier setting circuit such as a DIP switch is disposed in the battery module. The manager sets a desired identifier by changing the DIP switch or the like of the battery module to a desired setting.

In Patent Document 1 to Patent Document 3, a technology for automatically setting the identifier of the battery module is disclosed. In the invention of Patent Document 1, battery modules are connected in series. In this invention, each battery module is assigned an identifier corresponding to its position. For example, an identifier of "1" is assigned to the battery module at the head. In Patent Documents 2 and 3, a master battery module decides the identifiers of other battery modules, and the identifiers are assigned to the other battery modules.

RELATED DOCUMENT

Patent Document

[Patent Document 1] Japanese Patent Application Publication No. 2012-244794

[Patent Document 2] Japanese Patent Application Publication No. 2013-109628

[Patent Document 3] PCT Japanese Translation Patent Publication No. 2015-507451

SUMMARY OF THE INVENTION

Technical Problem

In a case where a plurality of battery modules having the same identifier are present in one network, a communication collision occurs, and communication is not correctly performed. The present inventor has found a new method in which each battery module autonomously decides its identifier such that a duplicate does not occur between the battery modules. An object of the present invention is to provide a new technology in which each battery module autonomously decides its identifier such that a duplicate does not occur between the battery modules.

Solution to Problem

A battery module of the present invention is a battery module that is connected to a communication network constituting a bus type topology and is communicable with other battery modules through the communication network.

The battery module of the present invention includes 1) a transmission unit that transmits identifier information indicating a candidate identifier that is a candidate of a communication identifier used by the battery module to all of the other battery modules through the communication network, 2) a communication arbitration unit that performs communication arbitration for the transmitted identifier information, and 3) a decision unit that decides the candidate identifier indicated in the transmitted identifier information as the communication identifier used by the battery module in a case of winning in the communication arbitration.

In a case of losing in the communication arbitration, the transmission unit further transmits the identifier information.

A control method of the present invention is executed by a battery module that is connected to a communication network constituting a bus type topology. The battery module is communicable with other battery modules through the communication network.

The control method includes 1) a transmission step of transmitting identifier information indicating a candidate identifier that is a candidate of a communication identifier used by the battery module to all of the other battery modules through the communication network, 2) a communication arbitration step of performing communication arbitration for the transmitted identifier information, and 3) a decision step of deciding the candidate identifier indicated in the transmitted identifier information as the communication identifier used by the battery module in a case of winning in the communication arbitration.

In the transmission step, in a case of losing in the communication arbitration, the identifier information is further transmitted.

A program of the present invention causes a computer to execute each step of the control method of the present invention.

In an information processing system of the present invention, a plurality of battery modules are communicably connected to each other through a communication network constituting a bus type topology.

The battery module includes 1) a transmission unit that transmits identifier information indicating a candidate identifier that is a candidate of a communication identifier used by the battery module to all of the other battery modules through the communication network, 2) a communication arbitration unit that performs communication arbitration for the transmitted identifier information, and 3) a decision unit that decides the candidate identifier indicated in the transmitted identifier information as the communication identifier used by the battery module in a case of winning in the communication arbitration.

In a case of losing in the communication arbitration, the transmission unit further transmits the identifier information.

Advantageous Effects of Invention

According to the present invention, a new technology in which each battery module autonomously decides its identifier such that a duplicate does not occur between the battery modules is provided.

BRIEF DESCRIPTION OF THE DRAWINGS

The above object and other objects, features, and advantages will become more apparent from example embodiments set forth below and the following drawings appended thereto.

FIG. 5 is a diagram illustrating a data structure of the identifier information transmitted from the battery module 2000 through a CAN communication network.

DESCRIPTION OF EMBODIMENTS

Hereinafter, example embodiments of the present invention will be described using the drawings. Note that the same constituents will be designated by the same reference signs in all of the drawings, and descriptions of such constituents will not be repeated.

Example Embodiment 1

Figure 1:
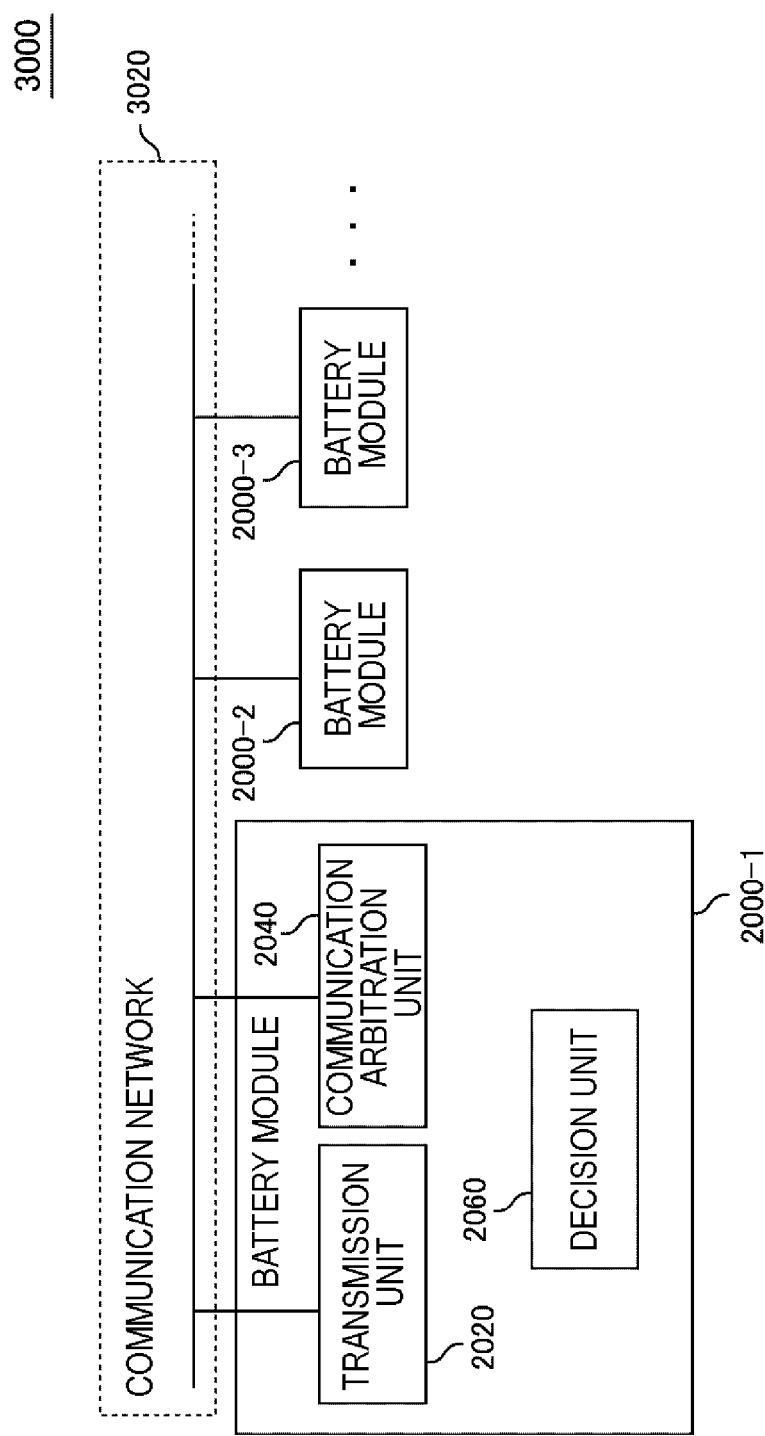
FIG. 1 is a block diagram illustrating an information processing system 3000 according to Example Embodiment 1.

FIG. 1 is a block diagram illustrating an information processing system 3000 according to Example Embodiment 1. In FIG. 1, each block is not a configuration of a hardware unit and represents a configuration of a function unit.

The information processing system 3000 includes a communication network 3020 and a plurality of battery modules 2000. The communication network 3020 is a communication network that communicably connects the battery modules 2000 to each other. Each battery module 2000 can communicate with another battery module 2000 included in the information processing system 3000 through the communication network 3020. The topology of the communication network 3020 is a bus type. For example, the communication network 3020 is a CAN communication network.

In the battery module 2000, an identifier that is used in communication through the communication network 3020 is set. Hereinafter, the identifier will be called a communication identifier. The battery module 2000 has a function of deciding the communication identifier of the battery module 2000. To do so, the battery module 2000 includes a transmission unit 2020, a communication arbitration unit 2060, and a decision unit 2080.

The transmission unit 2020 transmits identifier information to all of the other battery modules 2000 through the communication network 3020. The identifier information transmitted from the transmission unit 2020 indicates a candidate (hereinafter, a candidate identifier) of the communication identifier used by the battery module 2000 including said transmission unit 2020.

The communication arbitration unit 2060 performs communication arbitration for the identifier information transmitted by the transmission unit 2020. In the communication network having a bus type topology, data collision occurs in a case where data is transmitted at the same time from a plurality of communication terminals (battery modules 2000 in the present example embodiment). One of methods for dealing with the data collision is communication arbitration (arbitration). By performing the communication arbitration, one communication terminal that is allowed to transmit data is decided from the plurality of communication terminals Note that, being allowed to transmit data as a result of the communication arbitration is generally represented as "winning in the communication arbitration". On the other hand, being not allowed to transmit data as a result of the communication arbitration is represented as "losing in the communication arbitration". The communication terminal that wins in the communication arbitration continues transmitting data. On the other hand, the communication terminal that loses in the communication arbitration suspends or stops transmitting data. Consequently, data received by each communication terminal is data transmitted by the communication terminal winning in the communication arbitration.

In the case of winning in the communication arbitration performed by the communication arbitration unit 2060, the decision unit 2080 decides the candidate identifier indicated in the transmitted identifier information as the communication identifier used by the battery module 2000. On the other hand, in a case of losing in the communication arbitration performed by the communication arbitration unit 2060, the transmission unit 2020 transmits the identifier information again. In a case where the identifier information is transmitted again by the transmission unit 2020, processes of the communication arbitration unit 2060 and the decision unit 2080 are performed again. The processes of the transmission unit 2020, the communication arbitration unit 2060, and the decision unit 2080 are repeatedly performed until the communication identifier of the battery module 2000 is decided by the decision unit 2080.

<Advantageous Effect>

According to the information processing system 3000 of the present example embodiment, the battery module 2000 transmits the identifier information indicating the candidate identifier, which is the candidate of the communication identifier used in communication through the communication network 3020, to each of the other battery modules 2000. In the case of winning in the communication arbitration in the transmission, the candidate identifier is decided as the communication identifier. The winning of the battery module 2000 in the communication arbitration means that the other battery modules 2000 lose in the communication arbitration. Thus, by deciding the candidate identifier as the communication identifier on condition of winning in the communication arbitration when transmitting the identifier information, even if a plurality of the battery modules 2000 transmit the identifier information indicating the same candidate identifier at the same time, just a single battery module 2000 decides said candidate identifier as the communication identifier. Thus, a duplicate of the communication identifier between the plurality of battery modules 2000 can be prevented. In addition, according to the information processing system 3000 of the present example embodiment, each battery module 2000 can autonomously decide the communication identifier.

Hereinafter, the present example embodiment will be described in further detail.

<Hardware Configuration Example of Battery Module 2000>

Each functional configuration unit of the battery module 2000 may be implemented by hardware (example: a hard-wired electronic circuit) that implements each functional configuration unit, or may be implemented by a combination of hardware and software (example: a combination of an electronic circuit and a program controlling the electronic circuit). Hereinafter, a case where each functional configuration unit of the battery module 2000 is implemented by a combination of hardware and software will be further described.

Figure 2:
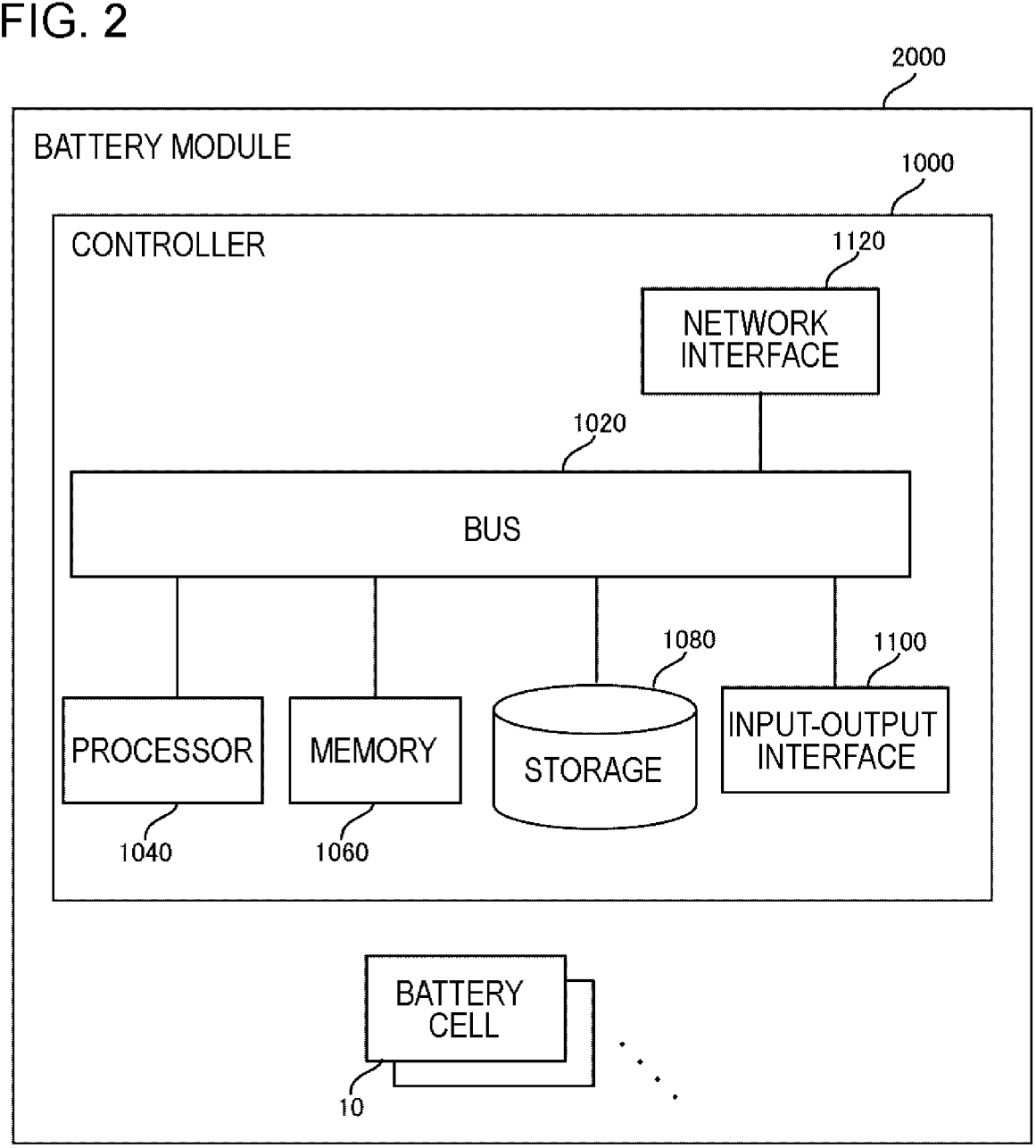
FIG. 2 is a diagram illustrating a hardware configuration of a battery module 2000.

FIG. 2 is a diagram illustrating a hardware configuration of the battery module 2000. The battery module 2000 includes a controller 1000 and a battery cell 10. The battery cell 10 is a secondary battery such as a lithium ion battery. The controller 1000 is a device that controls charging or discharging of the battery cell 10 or exchanges control information with the controller 1000 included in another battery module 2000. For example, the controller 1000 is a BMU.

The controller 1000 includes a bus 1020, a processor 1040, a memory 1060, a storage device 1080, an input-output interface 1100, and a network interface 1120. The bus 1020 is a data transfer path for the processor 1040, the memory 1060, the storage device 1080, the input-output interface 1100, and the network interface 1120 to transmit and receive data with each other. A method of connecting the processor 1040 and the like is not limited to bus connection. The processor 1040 is an operation processing device such as a micro processing unit (MPU) or a central processing unit (CPU). The memory 1060 is a main storage device such as a random access memory (RAM). The storage device 1080 is an auxiliary storage device such as a read only memory (ROM) or a flash memory. The input-output interface 1100 is an interface for connecting the controller 1000 and an input-output devices.

The network interface 1120 is an interface that connects the controller 1000 and the communication network 3020. The transmission unit 2020 implements transmission of the identifier information by outputting the identifier information to the network interface 1120. In addition, the communication arbitration unit 2060 performs the communication arbitration using data received through the network interface 1120.

The storage device 1080 stores a program module that implements each functional configuration unit of the battery module 2000. The processor 1040 implements each function corresponding to the program module by reading each program module into the memory 1060 and executing the program module.

The hardware configuration of the controller 1000 is not limited to the configuration illustrated in FIG. 2. For example, each program module may be stored in the memory 1060. In this case, the controller 1000 may not include the storage device 1080.

<Flow of Process>

Figure 3:
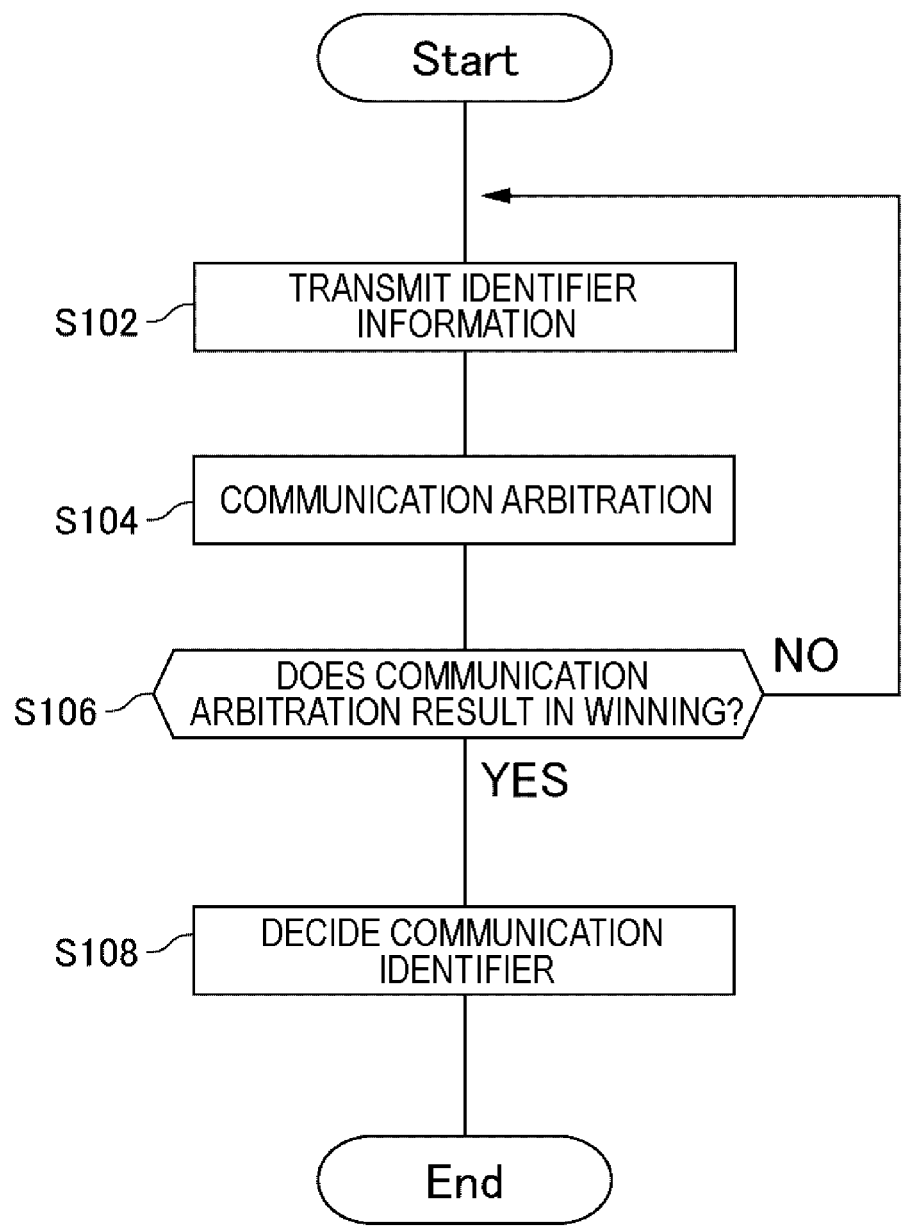
FIG. 3 is a flowchart illustrating a flow of process in the information processing system 3000 of Example Embodiment 1.

FIG. 3 is a flowchart illustrating a flow of process in the information processing system 3000 of Example Embodiment 1. The transmission unit 2020 transmits the identifier information (S102). The communication arbitration unit 2060 performs the communication arbitration (S104). In the case of winning in the communication arbitration (S106: YES), the decision unit 2080 decides the candidate identifier indicated in the identifier information transmitted from the transmission unit 2020 as the communication identifier of the battery module 2000 (S108). Then, the process in FIG. 3 is finished.

On the other hand, in the case of losing in the communication arbitration (S106: NO), the process in FIG. 3 returns to S102. At this point, there are a case of changing the candidate identifier indicated in the identifier information and a case of not changing the candidate identifier. Details of this point will be described below.

Figure 4:
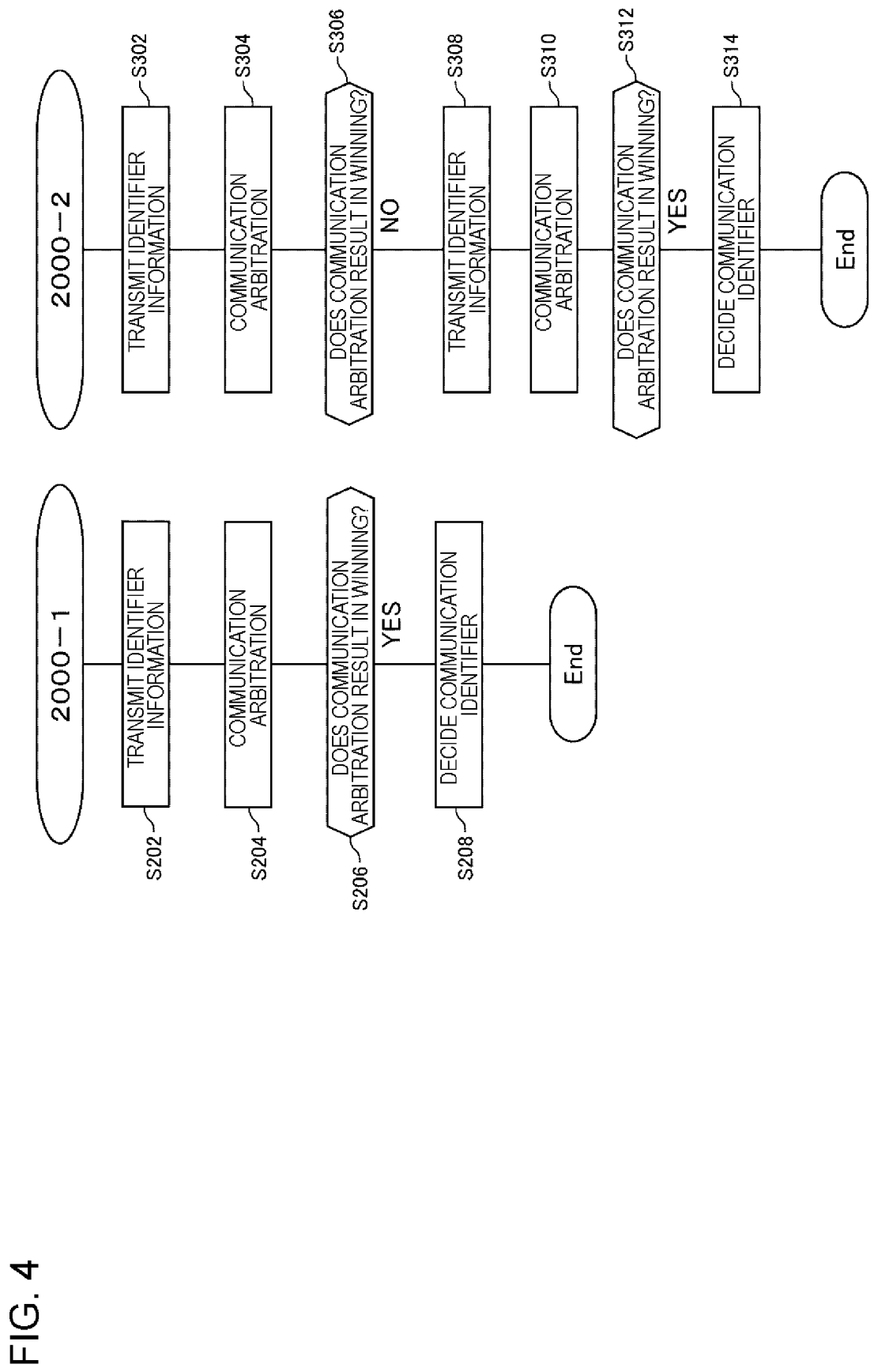
FIG. 4 is a flowchart illustrating a flow of process in each battery module 2000 in a case where two battery modules 2000 transmit identifier information at the same time.

FIG. 4 is a flowchart illustrating a flow of process in each battery module 2000 in a case where two battery modules 2000 transmit identifier information at the same time.

In S202, the transmission unit 2020 of a battery module 2000-1 transmits the identifier information. In addition, in S302, the transmission unit 2020 of a battery module 2000-2 transmits the identifier information.

In S204, the communication arbitration unit 2060 of the battery module 2000-1 performs the communication arbitration. In S304, the communication arbitration unit 2060 of the battery module 2000-2 performs the communication arbitration. It is assumed that the identifier information is transmitted at the same time from the battery module 2000-1 and the battery module 2000-2, and the battery module 2000-1 wins in the communication arbitration.

The decision unit 2080 of the battery module 2000-1 determines whether or not the communication arbitration results in winning (S206). As described above, since the battery module 2000-1 wins in the communication arbitration, the decision unit 2080 of the battery module 2000-1 decides the candidate identifier indicated in the identifier information transmitted from the transmission unit 2020 as the communication identifier of the battery module 2000-1 (S208).

Similarly, the decision unit 2080 of the battery module 2000-2 also determines whether or not the communication arbitration results in winning (S306). Since the battery module 2000-2 loses in the communication arbitration, the transmission unit 2020 of the battery module 2000-2 transmits the identifier information again (S308). Then, the communication arbitration unit 2060 of the battery module 2000-2 performs the communication arbitration (S310). The decision unit 2080 of the battery module 2000-2 determines whether or not the communication arbitration results in winning (S312). It is assumed that data is not transmitted from the other battery modules 2000, and thus, the battery module 2000-2 wins in the communication arbitration. Thus, the decision unit 2080 of the battery module 2000-2 decides the candidate identifier indicated in the identifier information transmitted in S308 as the communication identifier of the battery module 2000-2 (S314).

<Identifier Information>

The identifier information transmitted by the transmission unit 2020 of the battery module 2000 indicates the candidate (candidate identifier described above) of the communication identifier to be used by the battery module 2000 in communication through the communication network 3020. By transmitting the identifier information, the battery module 2000 declares to the other battery modules 2000 that the candidate identifier indicated in the identifier information is to be used as the communication identifier. For example, in a case where the communication network 3020 is a CAN communication network, the communication identifier represents an identifier (ID) in the CAN communication network. Hereinafter, the ID in the CAN communication network will be referred to as a CAN-ID.

FIG. 5 is a diagram illustrating a data structure of the identifier information transmitted from the battery module 2000 through the CAN communication network. Data that is transmitted and received in the CAN communication network generally includes the CAN ID and a data body. For example, the identifier information is configured to 1) indicate a common fixed value (for example, 0x6F2) for the identifier information in the CAN ID part and 2) indicate the candidate identifier and a unique number in the data body part. The battery module 2000 that receives data in which the fixed value is indicated in the CAN ID part can recognize that the data is the identifier information.

The unique number indicated in the data body part is a number unique to the battery module 2000. For example, a manufacturing number of the battery module 2000 or a manufacturing number of the network interface included in the battery module 2000 can be used as the number unique to the battery module 2000. The battery module 2000 that receives the identifier information in which a set of the candidate identifier and the unique number is indicated in the data body part can recognize that the "battery module 2000 determined by said unique number is to use said candidate identifier as the communication identifier".

Note that the data structure of the identifier information illustrated in FIG. 5 can also be employed in a case where the communication network 3020 is a communication network other than the CAN communication network. In addition, the data structure of the identifier information is not limited to the above data structure.

<Transmission of Identifier Information: S102>

The transmission unit 2020 transmits the identifier information in the communication network 3020 (S102). Note that a technology for transmitting data through the CAN communication network or the like can use well-known technologies.

The transmission unit 2020 generates the identifier information to be transmitted. Specifically, the transmission unit 2020 decides the candidate identifier and generates the identifier information indicating the decided candidate identifier. The transmission unit 2020 sets the candidate identifier to be one of the communication identifiers not used by the other battery modules 2000. Specifically, the transmission unit 2020 decides a value to be set as the candidate identifier from values that can be used as the communication identifier and do not correspond to the communication identifiers used by the other battery modules 2000.

For example, the transmission unit 2020 randomly decides one value from the values that can be used as the communication identifier and that is not equivalent to the communication identifiers used by the other battery modules 2000, and sets the decided value as the candidate identifier. Besides, for example, the transmission unit 2020 sets the candidate identifier to be the maximum or minimum value among the values that can be used as the communication identifier and that is not equivalent to the communication identifiers used by the other battery modules 2000.

In order to decide the candidate identifier using the above method, the transmission unit 2020 needs to determine the communication identifiers used by the other battery modules 2000. There are various methods of determining the communication identifiers used by the other battery modules 2000. Hereinafter, two methods will be illustrated.

<<Determination Method 1>>

Before deciding the candidate identifier, the transmission unit 2020 receives one or more data transmitted by other battery modules 2000 from the communication network 3020. For example, the reception is performed in a predetermined period. Information that defines the predetermined period may be set in advance in the transmission unit 2020 or may be stored in a storage device accessible from the transmission unit 2020.

For example, in a case where the communication network 3020 is the CAN communication network and where the received data is data other than the identifier information, the CAN ID part of the received data indicates the communication identifier that has already been used by the battery module 2000 that transmits the data. Thus, the transmission unit 2020 determines the value indicated in the CAN ID part as the communication identifier used by another battery module 2000. Meanwhile, in a case where the received data is the identifier information, the candidate identifier is indicated at a predetermined position in the data body part. The candidate identifier is to be used as the communication identifier by another battery module 2000. Therefore, the transmission unit 2020 also determines the candidate identifier indicated in the received identifier information as the communication identifier used by another battery module 2000.

<<Determination Method 2>>

The transmission unit 2020 may determine the communication identifiers used by the other battery modules 2000 by accessing the storage device storing the communication identifiers used by the other battery modules 2000. In this case, the information processing system 3000 includes an apparatus, other than the battery module 2000, that determines the communication identifier used by each battery module 2000 and puts the communication identifier into the storage device. Hereinafter, this apparatus will be called an identifier management apparatus.

The identifier management apparatus receives each data transmitted through the communication network 3020 and determines the communication identifier used by the battery module 2000 that has transmitted the data based on the data. A method of determining the communication identifier used by the battery module 2000 that has transmitted the data based on the data transmitted through the communication network 3020 is the same as the method described in Determination Method 1 described above. The identifier management apparatus puts the communication identifier determined using the method into the storage device. By doing so, a list of communication identifiers used by the battery modules 2000 is formed in the storage device.

Any of the above two determination methods determines the communication identifier used by the battery module 2000 using the data transmitted by the battery module 2000. Thus, it is preferable that each battery module 2000 is configured to periodically transmit some data. Note that the transmitted data may be any data including the communication identifier. By periodically transmitting data from each battery module 2000, the battery module 2000 or the identifier management apparatus can more securely recognize the communication identifier used by each battery module 2000.

<Communication Arbitration: S104>

As described above, the communication network 3020 has a bus type topology. Thus, in a case where data is transmitted at the same time from the plurality of communication terminals, data collision occurs. Note that various well-known technologies can be used in the communication arbitration. Hereinafter, a method of the communication arbitration will be specifically illustrated in a case where the communication network 3020 is the CAN communication network.

The CAN communication network generally has the following function in order to implement the communication arbitration. First, in the CAN communication network, the state of a signal line at a certain time is any of a state representing a logical value 0 (dominant) and a state representing a logical value 1 (recessive). In a case where the dominant and the recessive are transmitted at the same time, the dominant is prioritized, and the state of the signal line is set to the dominant Thus, in a case where data collision occurs, the state of the signal line represents a bit having a smaller value among bits transmitted at the same time.

In order to judge whether the communication arbitration results in winning or losing, the communication terminal connected to the CAN communication network transmits data through the CAN communication network and checks data received through the CAN communication network. In a case where the transmitted bit is different from the received bit, the communication terminal judges that the communication arbitration results in losing, and suspends or stops transmitting data. On the other hand, in a case where the transmitted bit is the same as the received bit, the communication terminal judges that the communication arbitration results in winning at least at the time of checking and continues transmitting data. Thus, the communication terminal that wins in the communication arbitration can continue and finish transmitting data. In other words, the communication terminal that receives the same bit array as a bit array constituting the transmitted data is the communication terminal finally winning in the communication arbitration.

The communication arbitration unit 2060 performs the communication arbitration using the same method as the above method. That is, while the identifier information is transmitted from the transmission unit 2020, data is received from the communication network 3020. While the bit received from the communication network 3020 is the same as the bit transmitted from the transmission unit 2020, it is judged that the communication arbitration results in winning, and the transmission unit 2020 is caused to continue transmitting the identifier information. On the other hand, in a case where the bit received from the communication network 3020 is different from the bit transmitted from the transmission unit 2020, it is judged that the communication arbitration results in losing, and the transmission unit 2020 is caused to stop transmitting the identifier information.

<Decision of Communication Identifier: S108>

In the case of winning in the communication arbitration described above, the decision unit 2080 decides the candidate identifier indicated in the identifier information transmitted by the transmission unit 2020 as the communication identifier to be used by the battery module 2000. On the other hand, in the case of losing in the communication arbitration described above, the decision unit 2080 does not decide the candidate identifier indicated in the identifier information transmitted by the transmission unit 2020 as the communication identifier to be used by the battery module 2000.

Figure 6:
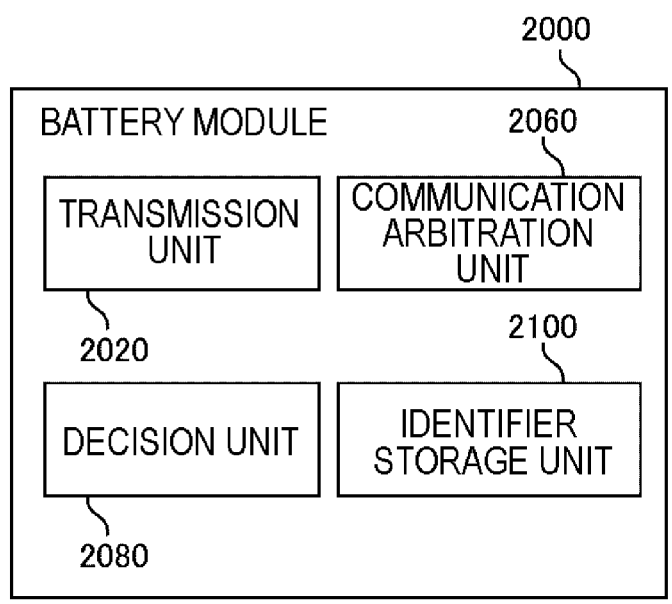
FIG. 6 is a diagram illustrating the battery module 2000 including an identifier storage unit 2100.

The decision unit 2080 stores the decided communication identifier in a storage device. The storage device is called an identifier storage unit. FIG. 6 is a diagram illustrating the battery module 2000 including an identifier storage unit 2100. For example, the identifier storage unit 2100 is implemented using the storage device 1080 included in the controller 1000 described above.

<Case of Losing Communication Arbitration: S110>

A case of losing in the communication arbitration can be divided into the following three cases with focus on the data transmitted from the other battery modules 2000. A first case is a case where data other than the identifier information is transmitted from another battery module 2000. A second case is a case where the identifier information indicating the candidate identifier different from the candidate identifier of the battery module 2000 is transmitted from another battery module 2000. A third case is a case where the identifier information indicating the same candidate identifier as the candidate identifier of the battery module 2000 is transmitted from another battery module 2000.

In the first case and the second case, the communication arbitration results in losing, but the candidate identifier indicated in the identifier information is not used by another battery module 2000. Thus, the transmission unit 2020 transmits the identifier information again without changing the candidate identifier indicated in the identifier information.

On the other hand, in the third case, it is considered that the candidate identifier indicated in the identifier information is used by another battery modules 2000. Thus, the transmission unit 2020 changes the candidate identifier, and then transmits the identifier information. Specifically, the transmission unit 2020 executes a method of adding the candidate identifier indicated in the identifier information in the case of losing in the communication arbitration to the communication identifiers used by another battery modules 2000, and then deciding the candidate identifier described above.

A method of distinguishing the first to third cases will be illustrated in a case where, for example, the communication network 3020 is the CAN communication network. First, as described above, in a case where the communication network 3020 is the CAN communication network, the fixed value is set in the CAN ID part of the identifier information. Thus, in a case where the communication arbitration unit 2060 receives data other than the identifier information from another battery modules 2000 (first case), the CAN ID part of the data received from the communication network 3020 by the communication arbitration unit 2060 is different from the value set in the CAN ID part of the identifier information. Thus, distinction between the first case and the other cases can be implemented based on the CAN ID part of the data received from the communication network 3020. Specifically, the first case is a case where the communication arbitration unit 2060 judges that the communication arbitration results in losing while receiving the CAN ID part from the communication network 3020.

Next, a method of distinguishing the second case and the third case will be described. It is assumed that the identifier information is configured as illustrated in FIG. 5, and the data body part is configured in order of "candidate identifier, unique number". In this case, in a case where identification information having a different candidate identifier is transmitted from a plurality of battery modules 2000 (second case), the winning or losing in the communication arbitration is decided while the communication arbitration unit 2060 receives the candidate identifier part of the data from the communication network 3020. On the other hand, in a case where the identifier information having the same candidate identifier is transmitted from a plurality of battery modules 2000 (third case), the winning or losing in the communication arbitration is not decided while the communication arbitration unit 2060 receives the candidate identifier part of the data from the communication network 3020, and the winning or losing in the communication arbitration is decided while the unique number part is received. Thus, the second case is a case where the communication arbitration unit 2060 judges that the communication arbitration results in losing while receiving the candidate identifier part of the data from the communication network 3020. On the other hand, the third case is a case where the communication arbitration unit 2060 judges that the communication arbitration results in losing while receiving the unique number part of the data from the communication network 3020.

Note that the identifier information is configured as illustrated in FIG. 5, and the data body part is configured in order of "unique number, candidate identifier". Since the value unique to the battery module 2000 is set in the unique number part, the same unique number is not set in the data transmitted at the same time. Thus, the winning or losing in the communication arbitration performed by the communication arbitration unit 2060 is at the latest decided while the unique number part is received. Thus, in a case where the candidate identifier is set after the unique number, it is not possible to distinguish whether the candidate identifier is the same or different. That is, the second case and the third case cannot be distinguished. Therefore, in a case not corresponding to the first case, that is, in a case where the communication arbitration unit 2060 judges that the communication arbitration results in losing based on the unique number part of the identifier information, the transmission unit 2020 always changes the candidate identifier, and then transmits the identifier information.

Note that the transmission unit 2020 may not distinguish the first case to the third case. In this case, in the case of losing in the communication arbitration, the transmission unit 2020 always changes the candidate identifier, and then transmits the identifier information again.

<Timing at which Battery Module 2000 Executes Series of Processes>

A timing at which the battery module 2000 performs a series of processes (processes illustrated in FIG. 3) is not limited. For example, the battery module 2000 decides the communication identifier by performing the series of processes illustrated in FIG. 3 as a series of initialization processes performed in a case where the battery module 2000 is started up. The start-up may be normal start-up due to an operation of switching a power supply switch ON, or may be start-up due to a recovery from a malfunction such as a power outage. Besides, for example, the battery module 2000 may execute the series of processes illustrated in FIG. 3 after an elapse of a predetermined time from the start-up of the battery module 2000 or after the elapse of the predetermined time from the end of the initialization process of the battery module 2000. The predetermined time may be set in advance in the transmission unit 2020 or may be stored in the storage device accessible from the transmission unit 2020.

Note that the initialization process of the battery module 2000 may not be performed each time the battery module 2000 is started up. In this case, for example, the battery module 2000 receives an input specifying whether or not to execute the initialization process. In a case where execution of the initialization process is specified, the battery module 2000 executes the initialization process and executes the series of processes in FIG. 3 along with the execution of the initialization process.

The above input may be provided before the start-up of the battery module 2000 or may be performed after the start-up of the battery module 2000. For example, the input provided before the start-up of the battery module 2000 is an input by a DIP switch. For example, the input provided after the start-up of the battery module 2000 is an input provided using an input device such as a keyboard.

Besides, for example, the battery module 2000 may judge whether or not the communication identifier is stored in the identifier storage unit 2100 and execute the series of processes in FIG. 3 in a case where the communication identifier is not stored in the identifier storage unit 2100.

Example Embodiment 2

Figure 7:
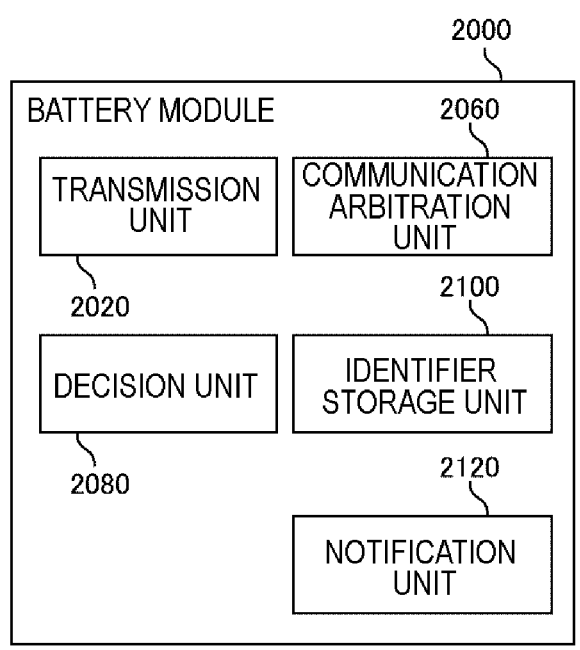
FIG. 7 is a block diagram illustrating the information processing system 3000 of Example Embodiment 2.

FIG. 7 is a block diagram illustrating the information processing system 3000 of Example Embodiment 2. The information processing system 3000 of Example Embodiment 2 has the same function as the information processing system 3000 of Example Embodiment 1 except for the points described below.

The battery module 2000 of Example Embodiment 2 includes the identifier storage unit 2100 and a notification unit 2120. The identifier storage unit 2100 is the same as described above. The notification unit 2120 performs notification in a case where the communication identifier is stored in the identifier storage unit 2100 before the transmission unit 2020 transmits the identifier information.

An example case where the communication identifier is stored in the identifier storage unit 2100 before the transmission unit 2020 transmits the identifier information is a case where the communication identifier set in the battery module 2000 when the battery module 2000 is operated in the past is not deleted and has kept stored in the identifier storage unit 2100. In such a case, it is preferable to notify a user of a fact that the communication identifier has kept stored. Therefore, the notification unit 2120 of the present example embodiment performs the notification. By doing so, it is possible to prevent the communication identifier used in the past from being used without recognition by the user.

For example, the user of the battery module 2000 who recognizes the notification performed by the notification unit 2120 deletes the communication identifier stored in the identifier storage unit 2100, and then causes the battery module 2000 to perform the series of processes in FIG. 3. For example, the user deletes the communication identifier stored in the identifier storage unit 2100, and then provides an input specifying the execution of the initialization process to the battery module 2000.

The notification performed by the notification unit 2120 is not limited. For example, the notification unit 2120 notifies of the storage of the communication identifier in the identifier storage unit 2100 by outputting audio, such as a beep sound, from a speaker. Besides, for example, the notification unit 2120 may notify of the storage of the communication identifier in the identifier storage unit 2100 by turning on a lamp (for example, a light emitting diode (LED) lamp) disposed in the casing of the battery module 2000. Besides, for example, the notification unit 2120 may perform the notification by displaying a message indicating the storage of the communication identifier in the identifier storage unit 2100 on a display device connected to the battery module 2000.

<Hardware Configuration>

For example, a hardware configuration of the battery module 2000 of the present example embodiment is represented in FIG. 2 in the same manner as the hardware configuration of the battery module 2000 of Example Embodiment 1. However, the storage device 1080 of the present example embodiment further includes a program module implementing the function of the notification unit 2120. In addition, hardware (the speaker, the lamp, the display device, or the like) for implementing the notification unit 2120 is connected to the input-output interface 1100 of the present example embodiment.

While example embodiments of the present invention have been described thus far with reference to the drawings, the example embodiments are illustrations of the present invention, and combinations of the example embodiments or various configurations other than those described above can be employed.

A part or all of the example embodiments may be disclosed as in the following appendix but is not limited thereto.

1. A battery module that is connected to a communication network constituting a bus type topology and is communicable with other battery modules through the communication network, the battery module comprising:

a transmission unit that transmits identifier information indicating a candidate identifier that is a candidate of a communication identifier used by the battery module to all of the other battery modules through the communication network;

a communication arbitration unit that performs communication arbitration for the transmitted identifier information; and a decision unit that decides the candidate identifier indicated in the transmitted identifier information as the communication identifier used by the battery module in a case of winning in the communication arbitration, wherein in a case of losing in the communication arbitration, the transmission unit further transmits the identifier information.

2. The battery module according to 1, wherein the communication network is a controller access network (CAN) communication network.

3. The battery module according to 1 or 2, wherein the transmission unit receives data transmitted from the other battery modules for a predetermined time before transmitting the identifier information, determines the communication identifiers used by the other battery modules transmitting the data based on the data, and sets a value other than the determined communication identifiers as the candidate identifier.

4. The battery module according to any one of 1 to 3, wherein in a case of losing in the communication arbitration, the transmission unit changes the candidate identifier indicated in the identifier information, and then transmits the identifier information.

5. The battery module according to any one of 1 to 4, further comprising:

a storage unit that stores the communication identifier of the battery module, wherein in a case where the communication identifier of the battery module is not stored in the storage unit, the transmission unit transmits the identifier information, and a notification unit that performs predetermined notification in a case where the communication identifier is stored in the storage unit before the transmission unit transmits the identifier information.

6. A control method that is executed by a battery module that is connected to a communication network constituting a bus type topology, the battery module being communicable with other battery modules through the communication network, the control method comprising:

a transmission step of transmitting identifier information indicating a candidate identifier that is a candidate of a communication identifier used by the battery module to all of the other battery modules through the communication network, a communication arbitration step of performing communication arbitration for the transmitted identifier information, and a decision step of deciding the candidate identifier indicated in the transmitted identifier information as the communication identifier used by the battery module in a case of winning in the communication arbitration, wherein in the transmission step, in a case of losing in the communication arbitration, the identifier information is further transmitted.

7. The control method according to 6, wherein the communication network is a controller access network (CAN) communication network.

8. The control method according to 6 or 7, wherein in the transmission step, data transmitted from the other battery modules is received for a predetermined time before the identifier information is transmitted, the communication identifiers used by the other battery modules transmitting the data is determined based on the data, and a value other than the determined communication identifiers is set as the candidate identifier.

9. The control method according to any one of 6 to 8, wherein in the transmission step, in a case of losing in the communication arbitration, the candidate identifier indicated in the identifier information is changed, and then the identifier information is transmitted.

10. The control method according to any one of 6 to 9, wherein the battery module further includes a storage unit that stores the communication identifier of the battery module, in the transmission step, in a case where the communication identifier of the battery module is not stored in the storage unit, the transmission unit transmits the identifier information, and a notification step of performing predetermined notification in a case where the communication identifier is stored in the storage unit before the identifier information is transmitted in the transmission step is included.

11. A program that causes a computer to execute each step of the control method according to any one of 6 to 10.

12. An information processing system in which a plurality of battery modules are communicably connected to each other through a communication network constituting a bus type topology, wherein the battery module includes a transmission unit that transmits identifier information indicating a candidate identifier that is a candidate of a communication identifier used by the battery module to all of the other battery modules through the communication network, a communication arbitration unit that performs communication arbitration for the transmitted identifier information, and a decision unit that decides the candidate identifier indicated in the transmitted identifier information as the communication identifier used by the battery module in a case of winning in the communication arbitration, and in a case of losing in the communication arbitration, the transmission unit further transmits the identifier information.

13. The information processing system according to 12, wherein the communication network is a controller access network (CAN) communication network.

14. The information processing system according to 12 or 13, wherein the transmission unit receives data transmitted from the other battery modules for a predetermined time before transmitting the identifier information, determines the communication identifiers used by the other battery modules transmitting the data based on the data, and sets a value other than the determined communication identifiers as the candidate identifier.

15. The information processing system according to any one of 12 to 14, wherein in a case of losing in the communication arbitration, the transmission unit changes the candidate identifier indicated in the identifier information, and then transmits the identifier information.

16. The information processing system according to any one of 12 to 15, comprising:
a storage unit that stores the communication identifier of the battery module,
wherein in a case where the communication identifier of the battery module is not stored in the storage unit, the transmission unit transmits the identifier information, and
the battery module includes a notification unit that performs predetermined notification in a case where the communication identifier is stored in the storage unit before the transmission unit transmits the identifier information.

This application claims the benefit of priority from Japanese Patent Application No. 2017-030350 filed on Feb. 21, 2017, the entire disclosure of which is incorporated herein.

The invention claimed is:

1. A battery module that is connected to a communication network constituting a bus type topology and is communicable with other battery modules through the communication network, the battery module comprising:
   a transmission unit that transmits identifier information indicating a candidate identifier that is a candidate of a communication identifier used by the battery module to all of the other battery modules through the communication network;
   a communication arbitration unit that performs communication arbitration for the transmitted identifier information; and
   a decision unit that decides the candidate identifier indicated in the transmitted identifier information as the communication identifier used by the battery module in a case of winning in the communication arbitration,
   wherein in a case of losing in the communication arbitration, the transmission unit further transmits the identifier information.

2. The battery module according to claim 1, wherein the communication network is a controller access network (CAN) communication network.

3. The battery module according to claim 1, wherein the transmission unit receives data transmitted from the other battery modules for a predetermined time before transmitting the identifier information, determines the communication identifiers used by the other battery modules transmitting the data based on the data, and sets a value other than the determined communication identifiers as the candidate identifier.

4. The battery module according to claim 1, wherein in a case of losing in the communication arbitration, the transmission unit changes the candidate identifier indicated in the identifier information, and then transmits the identifier information.

5. The battery module according to claim 1, further comprising:
   a storage unit that stores the communication identifier of the battery module,
   wherein in a case where the communication identifier of the battery module is not stored in the storage unit, the transmission unit transmits the identifier information, and
   a notification unit that performs predetermined notification in a case where the communication identifier is stored in the storage unit before the transmission unit transmits the identifier information.

6. A control method that is executed by a battery module that is connected to a communication network constituting a bus type topology, the battery module being communicable with other battery modules through the communication network, the control method comprising:
   transmitting identifier information indicating a candidate identifier that is a candidate of a communication identifier used by the battery module to all of the other battery modules through the communication network,
   performing communication arbitration for the transmitted identifier information, and
   deciding the candidate identifier indicated in the transmitted identifier information as the communication identifier used by the battery module in a case of winning in the communication arbitration,
   wherein in a case of losing in the communication arbitration, further transmitting the identifier information.

7. The control method according to claim 6, wherein the communication network is a controller access network (CAN) communication network.

8. The control method according to claim 6, further comprising:
   receiving data transmitted from the other battery modules for a predetermined time before the identifier information is transmitted;
   determining the communication identifiers used by the other battery modules transmitting the data based on the data; and
   setting a value other than the determined communication identifiers as the candidate identifier.

9. The control method according to claim 6, further comprising:
   in a case of losing in the communication arbitration, changing the candidate identifier indicated in the identifier information, and then transmitting the identifier information.

10. The control method according to claim 6, wherein the battery module further includes a storage unit that stores the communication identifier of the battery module, and
    the control method further comprising:
    in a case where the communication identifier of the battery module is not stored in the storage unit, transmitting the identifier information; and
    performing predetermined notification in a case where the communication identifier is stored in the storage unit before the identifier information is transmitted.

11. A non-transitory computer-readable storage medium storing a program that causes a computer to execute each step of the control method according to claim 6.

12. An information processing system in which a plurality of battery modules are communicably connected to each other through a communication network constituting a bus type topology, wherein the battery module includes a transmission unit that transmits identifier information indicating a candidate identifier that is a candidate of a communication identifier used by the battery module to all of the other battery modules through the communication network, a communication arbitration unit that performs communication arbitration for the transmitted identifier information, and a decision unit that decides the candidate identifier indicated in the transmitted identifier information as the communication identifier used by the battery module in a case of winning in the communication arbitration, and in a case of losing in the communication arbitration, the transmission unit further transmits the identifier information.

13. The information processing system according to claim 12, wherein the communication network is a controller access network (CAN) communication network.

14. The information processing system according to claim 12, wherein the transmission unit receives data transmitted from the other battery modules for a predetermined time before transmitting the identifier information, determines the communication identifiers used by the other battery modules transmitting the data based on the data, and sets a value other than the determined communication identifiers as the candidate identifier.

15. The information processing system according to claim 12, wherein in a case of losing in the communication arbitration, the transmission unit changes the candidate identifier indicated in the identifier information, and then transmits the identifier information.

16. The information processing system according to claim 12, comprising:

a storage unit that stores the communication identifier of the battery module, wherein in a case where the communication identifier of the battery module is not stored in the storage unit, the transmission unit transmits the identifier information, and the battery module includes a notification unit that performs predetermined notification in a case where the communication identifier is stored in the storage unit before the transmission unit transmits the identifier information.

* * * * *